United States Patent Office 2,769,787
Patented Nov. 6, 1956

2,769,787

METHOD FOR REGENERATION OF CATION EXCHANGERS

Horace W. Diamond, Chicago, Ill., assignor to Morton Salt Company, Chicago, Ill., a corporation of Illinois No Drawing. Application June 4, 1954,
Serial No. 434,645

3 Claims. (Cl. 260—2.2)

This invention relates to a method and means for regenerating organic resins commonly employed as cation exchangers in commercial and domestic water softening operations. More particularly, this invention relates to a method and composition for regenerating cation exchangers capable of operating on the sodium cycle.

The most common method of softening water today is the cation exchange method in which the hard water to be treated is brought into contact with certain materials containing readily exchangeable hydrogen or sodium ions. As the hard water is passed through a bed of these materials, calcium ions as well as magnesium and iron ions causing the hardness are removed from the water by the cation exchange materials and replaced by the hydrogen or sodium ions. When the capacity of the particulate cation exchangers for removing these ions has been substantially reduced or exhausted, the material is regenerated in the usual case by treatment with brine which restores the exchange capacity by producing an ionizable sodium salt form of the material. Either the hydrogen or the sodium form of the cation exchangers can be regenerated with sodium chloride, the resulting material in either case thereafter functioning on what is referred to as the sodium cycle.

The foregoing broadly describes the essential nature of the regeneration process as applied to these materials. In practice, however, these cation exchangers are found to have their exchange capacity considerably diminished where iron is present in the water being treated. In these circumstances, the theoretical exchanging during regeneration of sodium for the removed iron ions does not occur in any complete manner and as the softening and subsequent regeneration cycles are successively repeated, the amount of iron in the ion exchange column gradually increases. Finally, with the capacity reduced to such a degree that efficient softening is no longer feasible, there is no alternative but to discard the iron-fouled material.

It is to be presumed that iron as dissolved in natural waters is in its more soluble bi-valent form which would exchange with sodium ions in the normal course of regeneration with sodium chloride. However, the aforementioned fact that iron, at least in a substantial part, does not exchange with the sodium during salt regeneration indicates that the iron adhering to the resin may be present in its less-soluble tri-valent form. It therefore is probably the ferrous form in contact with dissolved air which has been oxidized to the ferric state, this ferric form tending to precipitate and thereby occlude the surface of the resin.

Of importance equal to that of iron removal is the removal of organic materials normally present in water. These organic materials consist of various compounds such as the tannins which by virtue of their organic nature would normally be deemed to be removable by water purification methods, as distinguished from water softening which removes or reduces only the hardness of the water. However, it is an observed fact that cation exchange resins exhibit an affinity for and become coated with these organic substances to a point of substantial contamination. In water softening operations these organic substances, if not removed from the contaminated resin, will discolor the treated water when the resin, having been treated with sodium chloride, is returned to service.

Accordingly, it is an object of this invention to provide an improved method of regenerating cation exchange resins which method will effectuate a removal of iron deposited on the surface of the resins.

It is a further object of this invention to provide an improved method of regenerating cation exchange resins which method will achieve a removal of contaminating organic materials on the surface of the resins.

It is a further object to provide a composition for regeneration that will maintain the original softening capacity of cation exchange resins throughout repeated cycles of softening and regeneration.

These and other related objects are achieved by this invention wherein a mixture of a strong solid, soluble acid and sodium chloride is employed as a composite regeneration medium, the term regeneration as used in this specification and claims meaning fundamental rejuvenation and restoration of the treated resin as it equally embraces iron removal and removal of organic substances.

Although applicable to those cation exchange resins capable of operating on the sodium cycle, the concepts of this invention will find their greatest application in the regenerative treatment of the styrene type resin which is most widely used today. This resin, supplied in the sodium form saturated with water, is a monofunctional, sulfonated copolymer of styrene and divinylbenzene produced in spheroidal particles of essentially 16 to 40 mesh size.

Evidence of the popularity of this type of resin is found in the fact that it is widely manufactured, being variously identified by National Aluminate Company as Nalcite HCR, by Dow Chemical Company as Dowex 50, by Rohm & Haas as Amberlite IR-120, by The Permutit Company as Permutit Q, by Permutit Ltd. as Zeo-karb 225 and by Chemical Process Company as Chem Pro C-20.

The various types of units employed in domestic, municipal and industrial installations will have some effect in varying the manipulative steps of contacting the particulate cation exchanger with the composite regenerant of this invention. But in all installations, sodium chloride as brine is applied directly to the resin, the conditions affecting the capacity of the resin being varied for any chosen salt dosage. For example, with other conditions being equal, 15 pounds of salt per cubic foot of resin will produce a regenerated resin having a higher capacity than that resulting from the use of 5 pounds of salt per cubic foot. However, at any selected salt dosage it has been determined that a regeneration which allows for at least a 30 minute contact of at least an 8% salt solution by weight (30% of saturation) produces a most desirable exchange capacity.

Of the several suitable strong solid, water-soluble acids, i. e., citric, tartaric, sulfamic, sulfosalicylic, malic, maleic, succinic and itaconic, the results obtained using sulfamic acid have been found to be representative of results obtainable according to the teachings of this invention. In the laboratory work which established the merits of combining a strong, soluble acid and sodium chloride, a resin badly fouled with iron and organic materials having a measured capacity of 17,350 grains per cubic foot was employed. Before becoming fouled through repeated use and conventional sodium chloride regeneration cycles, this same resin had a rated capacity of 22,000 grains per cubic foot. These comparative values of capacity clearly indicate that softening efficiency of the resin had been very substantially diminished and that its capacity was beyond improvement by present-day methods of regenerating with sodium chloride alone.

0.02696 cu. ft. of Nalcite HCR to a bed height of 28.75 in. in a 1 7/16 in. inner diameter Tenite column was subjected to thorough backwashing to remove all loose iron and foreign material and then placed on a softening cycle having a flow rate of 5 gal./min./sq. ft. To evaluate resin capacity the water used was Chicago city water fortified with calcium chloride and magnesium sulfate to give a water of 30 grains per gallon hardness of which 20 grains were calcium and 10 grains were magnesium. Analysis by the versenate method permitted perpetual control of total hardness. Exhaustion of the bed on the softening cycle was carried to 1 grain per gallon hardness in the soft water effluent.

Before the regeneration cycle was begun the resin bed was again thoroughly backwashed. As the regenerant, 85.6 g. of the composition consisting of 90% or 77 g. of salt and 10% or 8.6 g. of sulfamic acid were dissolved as a 10% solution in water. The foregoing values are equivalent to 6 lbs. of salt and 0.6 lb. of acid per cubic foot of resin, the 6 lbs. of salt per cubic foot being a standard operating value in sodium chloride regeneration. The thus developed solution of salt and acid was passed through at the rate of 2.1 gal./sq. ft./hr.

By operating under these conditions in nine complete cycles of softening and regenerating we have increased the capacity of the depleted resin from 17,350 grains/cu. ft. to a regenerated capacity of 21,950 grains. The following shows the total amount of softening capacity that can be developed according to this improved technique.

| Softening and Regenerating Cycle | Softening Capacity, Grains/cu. ft. |
| --- | --- |
| 1 | 17,350 |
| 2 | 17,950 |
| 3 | 17,320 |
| 4 | 19,080 |
| 5 | 19,975 |
| 6 | 24,850 |
| 7 | 21,980 |
| 8 | 21,940 |
| 9 | 21,950 |

Obviously, the result in cycle 6 is out of line and can be explained as an error in taking measurements during the capacity determination. These values do not show a uniform rate of improvement with each cycle but this is understood to be not at all unusual for this type of test.

Inasmuch as cycles 7, 8 and 9 produce very similar results and in view of the original rated capacity for the resin of 22,000 grains, it was assumed that the capacity had been improved as much as possible and the test was concluded.

Other more lengthy tests indicate that these acids used in smaller amounts on the order of 1% by weight of the total acid-salt composition will maintain the cation exchange resin in an iron-free or practically iron-free state unoccluded by organic materials after it has been restored to the higher improved capacity using amounts of acid on the order of 10% by weight as described above. In the case of new resin the lesser amount would likewise be expected to keep the material clean and at a substantially undiminished capacity.

Although these acids are suitable by virtue of their acid strength and their ready solubility, consideration will have to be given to their corrosiveness in any particular type of equipment in which the water treatment occurs. In domestic softening uses the solid state of these acids makes for very convenient formulation and handling in conjunction with salt.

It is readily evident that by the instant method employing a mixture of acid and salt the capacity of the resin has been improved by more than 25%, at a cost that is negligible in comparison to the very high priced resin which would otherwise be needed as replacement for the iron-fouled material.

Having described this invention, what is claimed is:

1. A method of regenerating a resinous sulfonated copolymer of styrene and divinylbenzene that has a substantially exhausted softening capacity as a result of treating hard water, which comprises contacting said exhausted resinous copolymer with an aqueous solution of a composition comprising a major portion of sodium chloride and a minor portion of a solid water-soluble acid selected from the group consisting of citric, tartaric, sulfamic, sulfosalicylic, malic, maleic, succinic and itaconic acids.

2. The method of claim 1, wherein the contacting solution is an aqueous solution of a composition comprising approximately 90% by weight of sodium chloride and approximately 10% by weight of a solid water-soluble acid selected from the group consisting of citric, tartaric, sulfamic, sulfosalicylic, malic, maleic, succinic and itaconic acids.

3. A method of minimizing the fouling effect of iron and organic materials on a resinous sulfonated copolymer of styrene and divinylbenzene in a water softening system, which comprises contacting the resinous copolymer with a regenerating solution following each period during which the softening capacity of the copolymer becomes substantially exhausted from treating hard water, said regenerating solution being an aqueous solution of a composition comprising approximately 99% by weight of sodium chloride and approximately 1% by weight of a solid water-soluble acid selected from the group consisting of citric, tartaric, sulfamic, sulfosalicylic, malic, maleic, succinic and itaconic acids.

References Cited in the file of this patent

UNITED STATES PATENTS

| 2,117,478 | Hall | Mar. 17, 1938 |
| 2,150,961 | Cupery et al. | Mar. 21, 1939 |
| 2,176,347 | Jansen | Oct. 17, 1939 |
| 2,268,347 | Steinberg | Dec. 30, 1941 |
| 2,549,378 | Kunin | Apr. 17, 1951 |

OTHER REFERENCES

Nachod: Ion Exchange, Academic Press, 1949, pages 208 and 209.

British Pharmaceutical Codex, 1949, pages 15 and 1079.

King et al.: Journal American Chem. Soc., vol. 74, pages 1212 to 1215 (1952).